United States Patent Office 2,993,293
Patented July 25, 1961

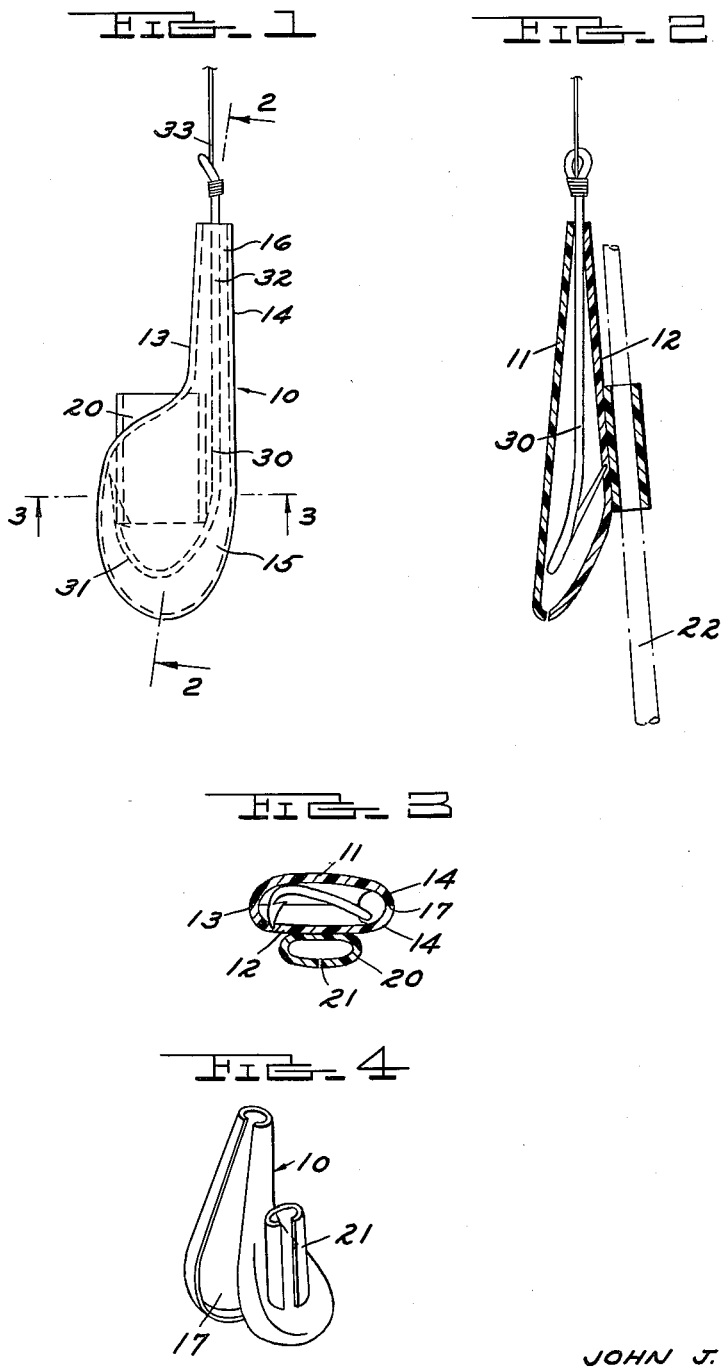
INVENTOR.
JOHN J. BLOUT

2,993,293
FISH HOOK PROTECTING POD
John J. Blout, 659 W. Canfield Ave., Detroit, Mich.
Filed Aug. 11, 1958, Ser. No. 754,194
1 Claim. (Cl. 43—57.5)

This invention relates to a fish hook protecting pod which encloses the hook and releasably engages the hook point.

Fish hook protective devices have been employed heretofore to protect fishermen and children against the sharp barbed hooks, however, the several devices of the prior art have not proved entirely satisfactory inasmuch as they are complicated in design and construction, expensive to manufacture, and unsatisfactory in use.

With the foregoing in view, the primary object of the invention is to provide a fish hook protective device of a pod type for receiving the whole hook which is inexpensive to manufacture, easy to use, and easy to engage and release the hook.

An object of the invention is to provide a synethetic resin case or pod having a longitudinal split in the edge thereof for sidewise inserting and extracting the hook.

An object of the invention is to provide a case or pod which is capable of holding the hook point in engagement with the material of the pod to prevent dislocation therebetween.

An object of the invention is to provide a split sleeve on the pod for attaching same to a fishing rod.

These and other objects of the invention will become apparent by reference to the following description of a fish hook protecting device embodying the invention taken in connection with the accompanying drawing in which:

FIG. 1 is a side elevational view of the device showing the hook in dotted lines.

FIG. 2 is a cross-sectional view of the device seen in FIG. 1 taken on the line 2—2 thereof.

FIG. 3 is a cross-sectional view of the device seen in FIG. 1 taken on line 3—3 thereof; and FIG. 4 is a perspective view of the device seen in force-expanding condition for receiving the hook therein.

Referring now to the drawing wherein like numerals refer to like and corresponding parts throughout the several views, the protective device disclosed therein to illustrate the invention comprises a case or pod 10 having side walls 11 and 12 and front and rear end walls 13 and 14 and it is to be noted that the pod has an enlarged hook receiving portion 15 and a reduced neck shank receiving portion 16 and that one end wall, such as 14, is longitudinally split as at 17 for side-wise receiving the hook and shank therebetween into the interior area of the pod 10.

A sleeve 20 is bonded to a side wall, such as 12, and the sleeve is split as at 21 so as to be resiliently opened to receive the fish rod 22 therein with the sleeve closing over the rod in gripping relationship.

Due to the fact that the pod 10 and sleeve 20 are made of resilient synethetic resin material, the pod 10 can be sprung open by the user to sidewise insert the hook 30 with the pod then springing back to enclose the hook and this is also true of the sleeve 20 when opened to receive the fish rod 22 with the sleeve springing back to grip the rod.

In operation the user expands the pod 10 as seen in FIG. 4 and sidewise inserts the hook 30 therethrough with the hook portion 31 lying in the enlarged chamber area 15 and with the shank portion 32 lying in the neck portion 16 and upon releasing the pod the springing action of the material closes the end wall 14 at the split 17 to incase the hook and shank and the user then pulls on the line 33 or the extending portion of the shank 32 so as to embed the hook point in the material of the pod which in conjunction with the clamping movement of the pod itself holds the hook in mechanically secured condition relative to the pod.

To remove the device it is only necessary to push downwardly on the hook shank to extract the hook portion from the material of the pod and to slide the hook sidewise outwardly of the pod via the split 17.

Although this single embodiment of the invention has been shown and described in detail, it is obvious that many changes may be made in the size, shape, detail, and arrangement of the various elements of the invention within the scope of the appended claim.

I claim:

A fishhook protective device for receiving a single fishhook having an elongated straight shank portion and a reversely curved hook portion comprising a resilient synthetic resin hollow body having the general shape of the fishhook and adapted to enclose the same, said body having front, rear, bottom and side walls integrally joined toegther at their corresponding edges, the upper portion of the front, rear and side walls being closely spaced to provide an elongated neck portion to receive the shank of the fishhook, the lower portion of the front wall being laterally offset a substantial distance to one side of the longitudinal axis of the neck portion, the bottom wall being curved and integrally joined to each of the walls at their lower edges, the lower portions of the front, rear, bottom and side walls together providing a chamber for receiving the reversely curved portion of the fishhook, the rear and bottom walls having a continuous split therethrough lying in a plane passing through the front wall, whereby the rear and bottom walls when sprung apart at the split are adapted to permit passage of the fishhook into the hollow of the body with the shank of the fishhook positioned in the neck and the reversely curved portion positioned in the chamber.

References Cited in the file of this patent

UNITED STATES PATENTS

| | | |
|---|---|---|
| 2,592,438 | Lawrenz | Apr. 8, 1952 |
| 2,627,133 | Pletcher | Feb. 3, 1953 |
| 2,733,533 | Standard | Feb. 7, 1956 |
| 2,775,060 | Barker | Dec. 25, 1956 |
| 2,878,610 | Herstedt | Mar. 24, 1959 |